United States Patent
Zheng et al.

(10) Patent No.: US 9,963,789 B2
(45) Date of Patent: May 8, 2018

(54) DISPLAY PANEL AND MANUFACTURING METHOD, PANEL DISPLAY DEVICE THEREOF

(71) Applicants: Hua Zheng, Guandong (CN); Shyh-Feng Chen, Guandong (CN); Pei Lin, Guandong (CN); Mingwen Lin, Guandong (CN); Liangdong Wu, Guandong (CN); Pan Gao, Guandong (CN); Shangpan Chen, Guandong (CN); Long Pan, Guandong (CN)

(72) Inventors: Hua Zheng, Guandong (CN); Shyh-Feng Chen, Guandong (CN); Pei Lin, Guandong (CN); Mingwen Lin, Guandong (CN); Liangdong Wu, Guandong (CN); Pan Gao, Guandong (CN); Shangpan Chen, Guandong (CN); Long Pan, Guandong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 134 days.

(21) Appl. No.: 15/084,754

(22) Filed: Mar. 30, 2016

(65) Prior Publication Data

US 2016/0208393 A1 Jul. 21, 2016

Related U.S. Application Data

(62) Division of application No. 13/643,089, filed on Oct. 24, 2012, now Pat. No. 9,323,080.

(51) Int. Cl.
*C23F 1/14* (2006.01)
*G02F 1/1333* (2006.01)

(52) U.S. Cl.
CPC ............. *C23F 1/14* (2013.01); *G02F 1/1333* (2013.01); *G02F 2001/133388* (2013.01); *Y10T 29/49* (2015.01); *Y10T 428/10* (2015.01)

(58) Field of Classification Search
CPC ............. G02F 1/134309; G02F 1/1333; G02F 1/1343; G02F 1/136; G02F 1/134336; G02F 1/14; G02F 2001/133388; G02F 2001/136295; G02F 2001/133328; Y10T 428/10; Y10T 29/49
USPC .......... 428/1.1; 29/592, 592.1; 349/139, 142, 349/152, 187; 445/24
See application file for complete search history.

(56) References Cited

U.S. PATENT DOCUMENTS

2008/0024415 A1* 1/2008 Jung ................... G02F 1/13454
345/92

\* cited by examiner

*Primary Examiner* — Ruiyun Zhang
(74) *Attorney, Agent, or Firm* — Andrew C. Cheng

(57) ABSTRACT

Provided is a display panel, which includes an active area and a vacant area surrounding the active area, and a dummy pattern area without display functionality being along a boundary between the active area and the vacant area. Also provided are a manufacturing method of a display panel and a panel display device. A dummy pattern area is provided along a boundary of an active area to withstand a loading effect and to ensure the active area is not affected by the loading effect and display patterns are normal and uniform.

9 Claims, 2 Drawing Sheets

DISPLAY PANEL AND MANUFACTURING METHOD, PANEL DISPLAY DEVICE THEREOF

CROSS REFERENCE TO RELATED APPLICATIONS

This is a divisional application of co-pending U.S. patent application Ser. No. 13/643,089, filed on Oct. 24, 2012, which claims priority of "DISPLAY PANEL AND MANUFACTURING METHOD, PANEL DISPLAY DEVICE THEREOF", application number 201210331726.4 submitted to China Patent Bureau on Sep. 10, 2012.

BACKGROUND OF THE INVENTION

1. Field of the Invention

The present invention relates to the field of image displaying techniques, and in particular to a panel display and a manufacturing method thereof, and a panel display device.

2. The Related Arts

Optical etching process is important to the manufacturing of a panel display device. The main steps comprise: thin film deposition→photo-resist coating→exposure→photo-resist lithography→thin film etching→photo-resist removal. Under normal circumstances, photo-resist lithography uses liquid lithography solution, and the thin film etching of metal (alloy) layer uses liquid etching solution for etching. Both are so called wet processes. In wet process, the thin film pattern on a substrate will affect local concentrations of an ingredient in the solution. That is, if the area of the photo-resist or the area of the metal (alloy) requires lithography is large, more ingredient will be consumed; on the other hand, if the area of the photo-resist or the area of the metal (alloy) requires lithography is small, less ingredient will be consumed.

The solution has a diffusion effect to maintain the same concentration everywhere in the solution. When differences exist in the thin film patterns on the substrate, the ingredient in the solution will diffuse from high concentration place to lower concentration place during the lithography or etching process, which leads to different lithography or etching result for a boundary area of the pattern and a center area of the pattern. This effect is referred to as loading effect.

The following takes a photo-resist lithography process of a pixel electrode layer of a liquid crystal panel as an example to explain the bad influence of the loading effect on an active area (AA) of the liquid crystal panel.

FIG. 1 shows a design of a pixel electrode layer of a known liquid crystal panel. The center of the panel is an active area 1, which has a small photo-resist area requiring lithography. The majority outside of the active area 1 is a vacant area 2, which has a large photo-resist area requiring lithography. By enlarging the view of the boundary area A' of the active area 1 in FIG. 1, the inner side design is a normal pixel area 3, with a tidy ITO electrode array, and the outer side design is the vacant area (without ITO electrode array) 4. Because of the loading effect, the actual photo-resist lithography process is different from the idealistic design. The actual result is shown in FIG. 2. Similarly, by enlarging the view of the boundary area A' of the active area 1 in FIG. 2, the boundary area 5 near the vacant area 4 will show pattern irregularity because of insufficient photo-resist lithography. The pixel irregularity becomes less towards the inner side, and the idealistic design appears at pixel area 3 that is located sufficiently inwards. The specific process that the loading effect affects photo-resist lithography is as follows: At the beginning of the lithography process, the active area 1 slowly consumes a small amount of lithography ingredient and the vacant area 2 rapidly consumes a large amount of lithography ingredient. The difference in concentration leads to lithography ingredient in the active area 1 diffusing towards vacant area 2. From the perspective of boundary area A' of the active area 1, lithography solution concentration at the boundary area 5 shows obvious gradient decreasing; that is, the closer to vacant area, the lower the concentration of lithography solution. In a subsequent lithography process, lithography capability in the boundary area 5 decreases in a gradient manner, and the photo-resist lithography result is less for pixels closer to the vacant area 4. The loading effect lessens the photo-resist lithography result of the boundary area 5, which leads to pattern irregularity of etching process (mainly, unable to etch pattern or coarse etched pattern).

The pattern irregularity in the boundary area 5 will cause defective image display. Not only the luminance, view angle and response time are different from those of the normal pixel area 3, but also influences the charging and discharging characteristics of the normal pixel area 3. Hence, it is desirable to eliminate pattern irregularity.

SUMMARY OF THE INVENTION

The technical issue to be addressed by the present invention is to provide a display panel, a manufacturing method and a panel display device thereof, able to maintain normal and uniform patterns in an active area.

The present invention provides a display panel, which comprises an active area and a vacant area surrounding the active area, and a dummy pattern area without display functionality being disposed along a boundary between the active area and the vacant area.

According to a preferred embodiment of the present invention, in a wet process of the display panel, a first solution concentration at an intersection area of a dummy pattern area and an active area is substantially equal to a second solution concentration at the active area, and a third solution concentration at a dummy pattern area gradually decreases from the intersection area towards the vacant area to form pattern irregularity in the dummy pixel area.

According to a preferred embodiment of the present invention, solution concentration at the active area stays unchanged.

According to a preferred embodiment of the present invention, the active area, the vacant area and the dummy pattern area are disposed on pattern layers of the display panel for lithography or etching in a wet process, and the pattern layers comprise: a pixel electrode layer, a first metal layer and a second metal layer.

According to a preferred embodiment of the present invention, the active area, the vacant area and the dummy pattern area are disposed on the pixel electrode layer and the dummy pattern area comprises a plurality of dummy pixels.

The present invention provides a manufacturing method of a display panel, which comprises the steps of: disposing an active area and a vacant area surrounding the active area; and disposing a dummy pattern area without display functionality along a boundary between the active area and the vacant area.

According to a preferred embodiment of the present invention, the dummy pattern area satisfies the following conditions: in a wet process of the display panel, a first solution concentration at an intersection area of the dummy pattern area and the active area is substantially equal to a second solution concentration at the active area, and a third solution concentration at the dummy pattern area gradually decreases from the intersection area towards the vacant area to form pattern irregularity in the dummy pixel area.

According to a preferred embodiment of the present invention, the active area, the vacant area and the dummy pattern area are disposed on pattern layers of the display panel for lithography or etching in a wet process, and the pattern layers comprise: a pixel electrode layer, a first metal layer and a second metal layer.

According to a preferred embodiment of the present invention, the active area, the vacant area and the dummy pattern area are disposed on the pixel electrode layer and the dummy pattern area comprises a plurality of dummy pixels.

The present invention provides a panel display device, which comprises a display panel, the display panel further comprising: an active area and a vacant area surrounding the active area, and a dummy pattern area without display functionality being along a boundary between the active area and the vacant area.

According to a preferred embodiment of the present invention, in a wet process of the display panel, a first solution concentration at an intersection area of the dummy pattern area and the active area is substantially equal to a second solution concentration at the active area, and a third solution concentration at the dummy pattern area gradually decreases from the intersection area towards the vacant area to form pattern irregularity in the dummy pixel area.

According to a preferred embodiment of the present invention, solution concentration at the active area stays unchanged.

According to a preferred embodiment of the present invention, the active area, the vacant area and the dummy pattern area are disposed on pattern layers of the display panel for lithography or etching in a wet process, and the pattern layers comprise: a pixel electrode layer, a first metal layer and a second metal layer.

According to a preferred embodiment of the present invention, the active area, the vacant area and the dummy pattern area are disposed on the pixel electrode layer and the dummy pattern area comprises a plurality of dummy pixels.

The efficacy of the present invention being distinguished from the state of the art is as follows. Because the display panel, the manufacturing method and the panel display device provided by the present invention dispose a dummy pattern area along a boundary of an active area to withstand a loading effect, the present invention ensures the active area is free from the loading effect and the patterns are normal and uniform.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following description refers to drawings and preferred embodiments of the present invention.

An embodiment of the present invention provides a display panel, which comprises an active area and a vacant area surrounding the active area, and a dummy pattern area without display functionality being along the boundary between the active area and the vacant area.

The present invention is applicable to pattern layers using a wet process for lithography or etching, such as, a pixel electrode layer, a first metal layer or a second metal layer. For convenience of description, the following uses the pixel electrode layer as an example for description.

Figure 3:
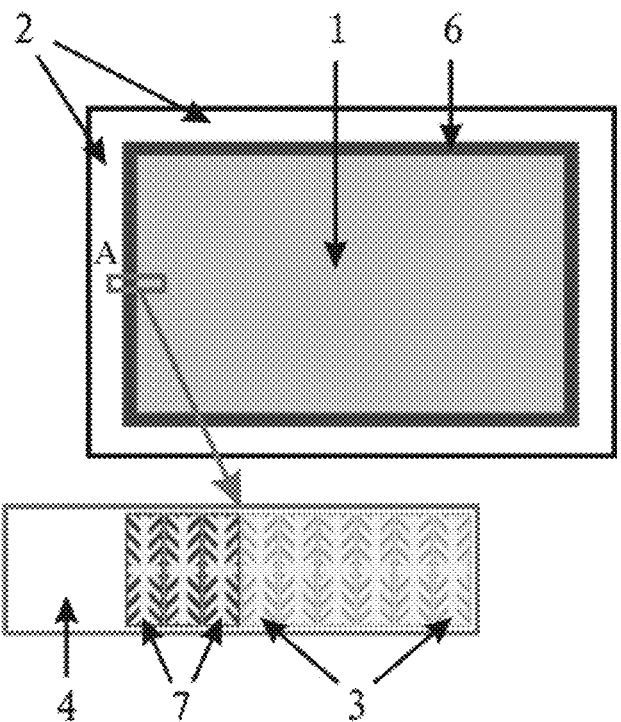
FIG. 3 is a schematic view showing the design of a display panel according to the present invention.
Figure 4:
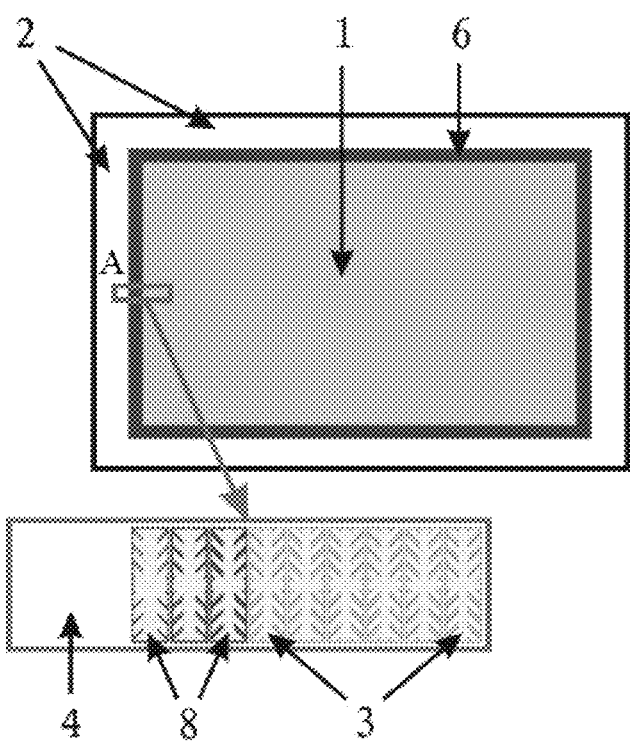
FIG. 4 is a schematic view showing the actual result of the design of a display panel according to the present invention.

Specifically, referring to FIGS. 3-4, FIG. 3 is a schematic view showing the design of a display panel according to the present invention; and FIG. 4 is a schematic view showing the actual result of the design of the display panel according to the present invention.

As shown in FIG. 3, a display panel of the embodiment of the present invention comprises an active area (AA) 1 and a vacant area 2 surrounding the active area 1, and a dummy pattern area 6 without display functionality being along a boundary of the active area 1 between the active area 1 and the vacant area 2. From an enlarged view of the boundary area A of the active area 1 in FIG. 3, the dummy pattern area 6 comprises a plurality of dummy pixels 7. The pattern design of the dummy pixel 7 can be identical to the pixel of a normal pixel area 3, or can be adjusted depending on application. The dummy pixel 7 has no electrical or optical functionality and is not connected to a drive signal; therefore, the dummy pixel 7 will neither affect the charging and discharging of the normal pixel area 3, nor increase the load of a driver circuit.

The following uses a lithography process as an example to explain how the display panel of the present invention achieves a normal display pattern without the loading effect.

Figure 1:
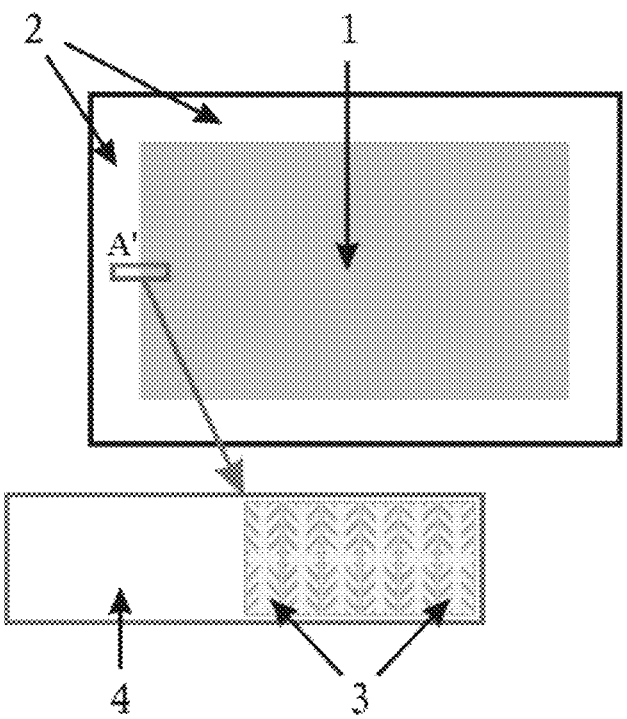
FIG. 1 is a schematic view showing the design of a known display panel.

At the beginning of lithography process, the active area 1 slowly consumes a small amount of lithography ingredient, and the vacant area 2 rapidly consumes a large amount of lithography ingredient. Difference of concentration drives the lithography ingredient to diffuse from the active area 1 toward the vacant area 2. In contrast to the known design in FIG. 1, the display panel of the present invention disposes a dummy pattern area 6 on the boundary of the active area 1. Under the influence of loading effect, lithography solution concentration at the dummy pattern area 6 shows obvious gradient decreasing outwards (that is from the normal pixel area 3 towards the vacant area 4). The closer area to the vacant area 4 is, the lower the lithography solution concentration is. In other words, a first solution concentration at an intersection area of the dummy pattern area 6 and the active area 1 is substantially equal to a second solution concentration at the active area 1, and a third solution concentration at the dummy pattern area 6 gradually decreases from the intersection area towards the vacant area 2 to form pattern irregularity in the dummy pixel area 6.

Figure 2:
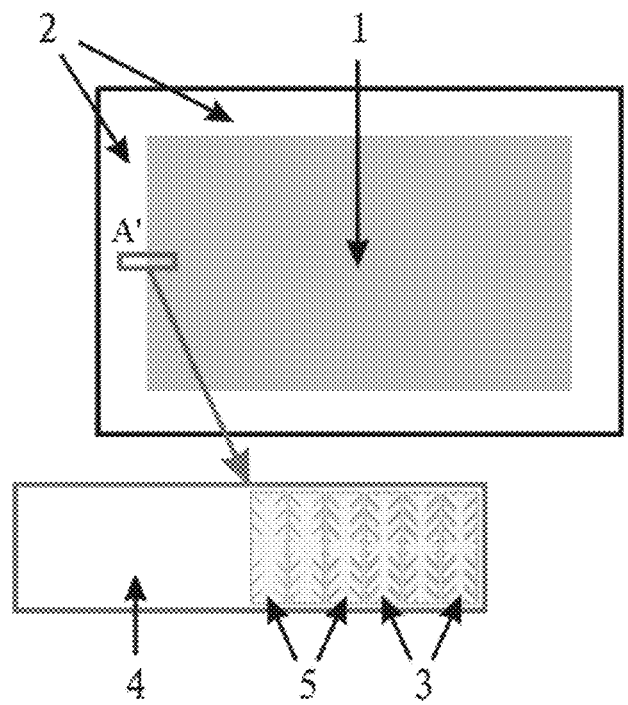
FIG. 2 is a schematic view showing the actual result of the design of a known display panel.

In a subsequent lithography process, lithography capability in the dummy pattern area 6 decreases in a gradient manner, and the photo-resist lithography result is less for pixels closer to the vacant area 4. The actual result is shown in FIG. 4. From an enlarged view of the boundary area A of the active area 1 in FIG. 4, the pattern of the dummy pixel 8 near the vacant area 4 is affected by the loading effect to form an irregular pattern, so that the entire normal pixel area 3 away from the vacant area 4 stays normal and uniform, in contrast to FIG. 2 showing an irregular boundary area 5.

The efficacy of the embodiment of the present invention being distinguished from the state of the art is as follows. Because all the pixels in the active area in the known technique are for displaying an image, the boundary pixels are easily affected by the loading effect during a wet process. The present embodiment of the present invention disposes a dummy pattern area 6 in the place of a boundary area 5 to withstand the loading effect. With the dummy pattern area 6 as a buffer, the normal pixel area 3 that is away from the vacant area 4 is not affected by the loading effect. All the patterns in the normal pixel area 3 are normal and uniform to ensure the patterns at each layer in the active area 1 are the same as the design. On the other hand, because the dummy pattern area 6 does not function for displaying, the displaying function of the display panel will not be affected even when the dummy pattern area 6 is affected by the loading effect.

The size of the dummy pattern area 6 and the required number and pattern of the dummy pixels can be determined by experiments. The only condition that must be met is: a first solution concentration at an intersection area of the dummy pattern area and the active area is substantially equal to a second solution concentration at the active area, and a third solution concentration at the dummy pattern area gradually decreases from the intersection area towards the vacant area to form pattern irregularity in the dummy pixel area.

Correspondingly, the second embodiment of the present invention provides a manufacturing method of a display panel, comprising the steps of: disposing an active area and a vacant area surrounding the active area; and disposing a dummy pattern area without display functionality along a boundary between the active area and the vacant area.

According to a preferred embodiment of the present invention, the dummy pattern area satisfies the following conditions: in a wet process of the display panel, a first solution concentration at an intersection area of the dummy pattern area and the active area is substantially equal to a second solution concentration at the active area, and a third solution concentration at the dummy pattern area gradually decreases from the intersection area towards the vacant area to form pattern irregularity in the dummy pixel area.

The active area, the vacant area and the dummy pattern area are disposed on pattern layers of the display panel for lithography or etching in the wet process, and the pattern layers comprise: a pixel electrode layer, a first metal layer and a second metal layer.

As a preferred embodiment, the active area, the vacant area and the dummy pattern area are disposed on the pixel electrode layer and the dummy pattern area comprises a plurality of dummy pixels.

After disposing the active area and the vacant area like a known technique, the instant embodiment further disposes the dummy pattern area without display functionality along the boundary between the active area and the vacant area. The present invention uses the dummy pattern area 6 to withstand loading effect, and ensure the active area 1 is free from loading effect. All the patterns in the normal pixel area 3 are normal and uniform. Because the dummy pattern area 6 does not function for displaying, the displaying function of the display panel will not be affected even when the dummy pattern area 6 is affected by loading effect.

The display panel in the first embodiment of the present invention can be applied to a liquid crystal display (LCD), a plasma display panel (PDP) organic LED (OLED), and so on. Hence, a third embodiment of the present invention provides a panel display device, comprising a display panel disclosed in the first embodiment of the present invention. The efficacy of the instant embodiment is based on the first embodiment, and the description is omitted.

Embodiments of the present invention have been described, but not intending to impose undue constraints to the claims. Any modification of equivalent structure or equivalent process made according to the disclosure and drawings of the present invention, or any application thereof, directly or indirectly, to other related fields of technique, is considered encompassed in the scope of protection defined by the appended claims.

What is claimed is:

1. A manufacturing method of a display panel, comprising the steps of:
    providing a display panel having a surface in which an active area and a vacant area surrounding the active area are defined;
    providing a film on the surface of the display panel such that a first portion of the film covers the active area and a second portion of the film covers the vacant area;
    subjecting the film to treatment with a wet process by applying a processing solution to the film;
    allowing the processing solution to react with the first and second portions of the film in the active area and the vacant area of the surface of the display panel such that a first portion of the processing solution reacts with the first portion of the film in the active area to form a first pattern and a second portion of the procession solution reacts with the second portion of the film in the vacant area to form a second pattern; and
    allowing the first and second portions of the processing solution to respectively undergo diffusion respectively in the active area and the vacant area such that the first portion of the processing solution demonstrates a first solution concentration and the second portion of the processing solution demonstrates a second solution concentration that is different from the first solution concentration, wherein the first solution concentration of the first portion of the processing solution has a substantially constant, first level in a central zone of the active area and the first solution concentration has a variable, second level in a peripheral zone of the active area that surrounds the central zone, the second level varying from the first level of the first solution concentration from the central zone toward the second solution concentration of the vacant area, such that peripheral zone of the active area forms a dummy pattern area in which a dummy pattern is formed and extends along a boundary between the active area and the vacant area; wherein the dummy pattern is separated, functionally and electrically, from the first pattern and provides no functionality.

2. The manufacturing method as claimed in claim 1, wherein the second level of the first solution concentration of the processing solution at an intersection area of the dummy pattern area and central zone of the active area is equal to the first, constant level of the first solution concentration at the central zone of the active area.

3. The manufacturing method as claimed in claim 1, wherein the wet process comprises one of a lithographic operation and an etching operation.

4. The manufacturing method as claimed in claim 1, wherein the film comprises a metal film and the first pattern comprises pixel electrodes, which are separated from the dummy pattern.

5. The manufacturing method as claimed in claim 4, wherein the dummy pattern comprises dummy pixels that are separated from the pixel electrodes.

6. The manufacturing method as claimed in claim 5, wherein the dummy pixels have a configuration identical to a configuration of the pixel electrodes.

7. The manufacturing method as claimed in claim 5, wherein the dummy pixels comprises first pixels located in an intersection area between the central zone and the peripheral zone of the active area and second pixels located in an intersection area between the peripheral zone of the active area and the vacant zone, wherein the first pixels have a configuration identical to the pixel electrodes and the second pixels have a configuration that is different from the pixel electrodes.

8. The manufacturing method as claimed in claim 1, wherein the first solution concentration is higher than the second solution concentration such that the variable second level of the first solution concentration demonstrates a gradient of concentration decreasing from the first constant level of the first solution concentration to the second solution concentration.

9. The manufacturing method as claimed in claim 7, wherein the second pixels of the dummy pixels demonstrate an irregular pattern, while first pixels of the dummy pixels comprise a predetermined configuration identical to a configuration of the pixel electrodes of the central zone of the active area.

* * * * *